United States Patent [19]

Perry et al.

[11] Patent Number: 5,030,410
[45] Date of Patent: Jul. 9, 1991

[54] VACUUM SYSTEM FOR NUCLEAR REACTOR GUIDE TUBE

[75] Inventors: Richard W. Perry, San Jose; Jack T. Matsumoto, Sunnyvale, both of Calif.

[73] Assignee: General Electric Company, San Jose, Calif.

[21] Appl. No.: 579,507

[22] Filed: Sep. 10, 1990

[51] Int. Cl.⁵ .............................................. G21C 19/32
[52] U.S. Cl. ...................................... 376/310; 15/395; 15/415.1
[58] Field of Search ............... 376/310, 353, 260, 313, 376/316; 15/304, 395, 415.1

[56] References Cited

U.S. PATENT DOCUMENTS

| | | | |
|---|---|---|---|
| 4,610,838 | 9/1986 | Gasparro et al. | 376/248 |
| 4,715,324 | 12/1987 | Muller et al. | 376/316 |
| 4,867,941 | 9/1989 | LeDantec | 376/316 |
| 4,959,146 | 9/1990 | Kristan | 376/310 |

Primary Examiner—Brooks H. Hunt
Assistant Examiner—Fredewrick H. Voss
Attorney, Agent, or Firm—R. R. Schroeder

[57] ABSTRACT

A vacuum system for cleaning the base of a control blade guide tube comprises a vacuum source and a novel vacuum head. The vacuum source includes a conventional vacuum pump and filter, for trapping matter entrained in water driven by the pump. The vacuum head is disk-shaped and has an off-axis vacuum port which can scan the guide tube base when the disk is rotated 360°. Elongated slots in the disk admit water down through the disk. Guide fins separate the slots from the vacuum port. The guide fins are shaped to provide a clearance over the guide tube base, effecting a highventuri action which helps sweep up debris on the guide tube base. An annular ridge on the disk surrounds a similar annular ridge on the base, isolating a control rod drive tube housing below the base from the vacuum. This prevents control rod drive components from being disturbed by the vacuum.

9 Claims, 7 Drawing Sheets

VACUUM SYSTEM FOR NUCLEAR REACTOR GUIDE TUBE

BACKGROUND OF THE INVENTION

This invention relates to nuclear reactors and, more particularly to a vacuum for a control rod guide tube of a boilingwater nuclear reactor. A major objective of the present invention is to provide for more thorough and convenient evacuation of particles and objects from the base of a control rod guide tube.

Fission reactors rely on fissioning of fissile atoms such as uranium isotopes (U233, U235) and plutonium isotopes (Pu239, Pu241). Upon absorption of a neutron, a fissile atom can disintegrate, yielding atoms of lower atomic weight and high kinetic energy along with several high-energy neutrons. The kinetic energy of the fission products is quickly dissipated as heat, which is the primary energy product of nuclear reactors. Some of the neutrons released during disintegration can be absorbed by other fissile atoms, causing a chain reaction of disintegration and heat generation. The fissile atoms in nuclear reactors are arranged so that the chain reaction can be self-sustaining.

To facilitate handling, fissile fuel is typically maintained in fuel elements. Typically, these fuel elements have a corrosionresistant cladding. The fuel elements can be grouped together at fixed distances from each other in a fuel bundle. A sufficient number of these fuel bundles are combined to form a reactor core capable of a self-sustaining chain reaction. Neutron-absorbing control rods are inserted into the core to control the reactivity of the core. The reactivity of the core can be adjusted by incremental insertions and withdrawals of the control rod.

Each control rod is housed within a vertical guide tube which ensures the vertical orientation and motion of the control rod. The control rod is moved using a control rod drive mechanism which is at least partially housed in a stub tube which also serves to support the base of the guide tube. The base of the guide tube has a diameter greater than the diameter of the stub tube so that the guide tube base can be a disk with a central hole through which the control rod drive uncoupling rod is mechanically coupled to the control rod.

Given that the control rods are the primary means for regulating reactor output, it is essential that the control rod drives remain fully functional. However, dust, sediment and various foreign objects falling into a drive mechanism housed in a stub tube can impair control rod drive functioning. Potentially, the control rod mechanism could jam, preventing control rod insertion and withdrawal. Alternatively, the foreign material can prevent the control rod drive mechanism from being removed for maintenance.

In the course of the present invention, foreign material, including rust particles, oxide dust, water impurities, and occasionally larger items, were found at the base of guide tubes. Turbulence, especially during removal and insertion of control rods could disturb these materials causing them to fall into the stub tubes, where they could impair control rod drive mechanisms. It was determined that sweeping was not an effective method of removing these materials from the guide tube base. Vacuums were problematic because they were difficult to position. Also, if the vacuum were great enough to remove the bulk of the material on the guide tube base, it could also remove control rod drive components from the stub tubes. For example, a control rod drive uncoupling rod could be pulled into the vacuum. What is needed is a system for cleaning control rod guide tubes which removes the bulk of material deposited on the base without disturbing the control rod drive mechanism.

SUMMARY OF THE INVENTION

In accordance with the present invention, a vacuum system includes a disk-shaped vacuum head with an off-axis vacuum port. The disk diameter is selected to conform to the inner diameter of a guide tube with sufficient tolerance to allow free rotation of the disk. An annular ridge is centered on the bottom of the disk; this annular ridge supports the disk on the guide tube base and isolates the passage to the stub tube from the vacuum. A pair of guide fins extend radially from the annular ridge and on both sides of the vacuum port. The fins leave a clearance of $\frac{1}{4}''$ to $\frac{1}{2}''$ above the guide tube base. They serve to constrict and therefore increase the velocity of the water (or other fluid) flow near the guide tube base. The increased velocity helps dislodge and sweep particles into the vacuum. A pole adaptor extends upward from the disk. Turning the pole adaptor permits a 360° sweep of the vacuum head.

At least one aperture through the disk admits fluid from above the disk to the space below when the vacuum is on. Preferably, there are two such apertures. In this case, each guide fin extends between the vacuum port and a respective one of the apertures. To ensure even flow, the apertures are elongated slots which run adjacent to and parallel to their respective guide fins. Suitably, the first and second fins can define a fin-to-fin angle of about 56°±6°, which angle is also defined by the elongated slots. The apex of the fin angle is near the center of the disk, while the apex of the slot-to-slot angle is off-axis in a direction 180° from the off-axis direction of the vacuum port.

The present invention is used while the reactor is shut down for routine maintenance. Typically, four fuel bundles associated with a guide tube are removed for replacement. An associated fuel support casting is removed. Then the control rod blade itself can be removed from the guide tube. An actuating pole is attached to the vacuum head pole adaptor and a vacuum hose or other channel to the vacuum port. The head is then lowered to the guide tube base. Once the disk is seated on the base, a vacuum source, attached to the vacuum hose, is activated and the pole is rotated manually from above the reactor vessel so that the disk within the guide tube turns 360° or more.

The use of a vacuum head which conforms to the guide tube ensures that the entire area to be vacuumed can be reached without having to reposition the vacuum head. The annular ridge protects the drive mechanism in the stub tube so that a strong vacuum can be applied without the danger that a control rod drive uncoupling rod will be pulled by the vacuum. The guide fins provide a high Venturi effect which helps dislodge material from the guide tube base. The elongated slots ensure an even fluid flow across the guide fins. These and other features and advantages of the present invention are apparent in the following description with references to the drawings below.

DESCRIPTION OF THE PREFERRED EMBODIMENTS

Figure 1:
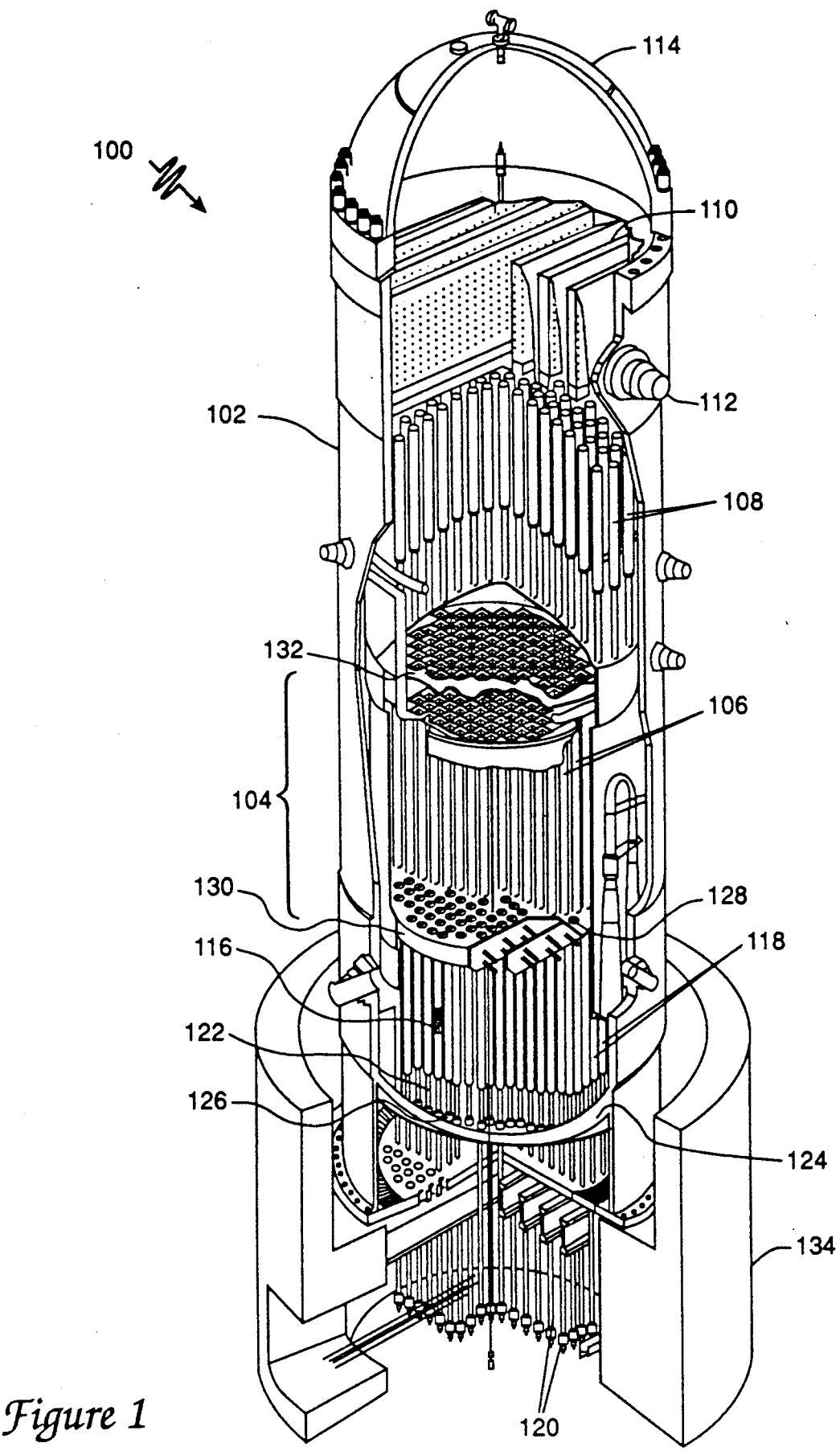
FIG. 1 is a partially schematic perspective and cutaway view of a boiling-water reactor vessel which serves as the context for the present invention.

The preferred embodiment of the present invention is designed for use in a nuclear reactor 100 comprising a reactor vessel 102 and its internals, as shown in FIG. 1. Heat is generated within the core 104 of reactor 100, which includes fuel bundles 106 of fissionable material. Water circulated up through core 104 is at least partially converted to steam. A steam separator 108 separates steam from water, which is recirculated. Residual water is removed from the steam by a steam dryer 110. The steam then exits reactor 100 through an steam exit 112 near a vessel head 114.

The amount of heat generated in core 104 is regulated by inserting and withdrawing control blades 116. Control blades 116 are vertically extending elements with cruciform cross sections. They include rods of neutron-absorbing material, such as hafnium. To the extent that a control blade 116 is inserted into core 104, it absorbs neutrons that would otherwise be available to promote the chain reaction which generates heat in core 104.

Control rod guide tubes 118 below core 104 maintain the vertical motion of control blades 116 during insertion and withdrawal. Hydraulic control rod drives 120 effect the insertion and withdrawal of control blades 116. The mechanical linkages between rod drives 120 and control blades 116 are housed in tubular control rod drive (CRD) housings 122. CRD housings 122 extend through vessel bottom 124 of vessel 102, where they are welded to stub tubes 126, which are in turn welded to vessel bottom 124. In addition to the control rod drive mechanism, CRD housings 122 include a CRD uncoupling rod (not shown) which is used to decoupled a rod drive 120 from a control blades 116 during replacement operations. This uncoupling rod is an example of a component that could be drawn out of a CRD housing 122 under the force of a vacuum.

Fuel bundles 106 are supported from below by a fuel support casting 128 mounted on a core support plate 130 located at the base of core 104. A top guide 132 helps align fuel bundles 106 as they are lowered into core 104. Vessel 102 is mounted on a concrete pedestal 134 which defines a space below where access can be had to control rod drives 120.

Figure 2:
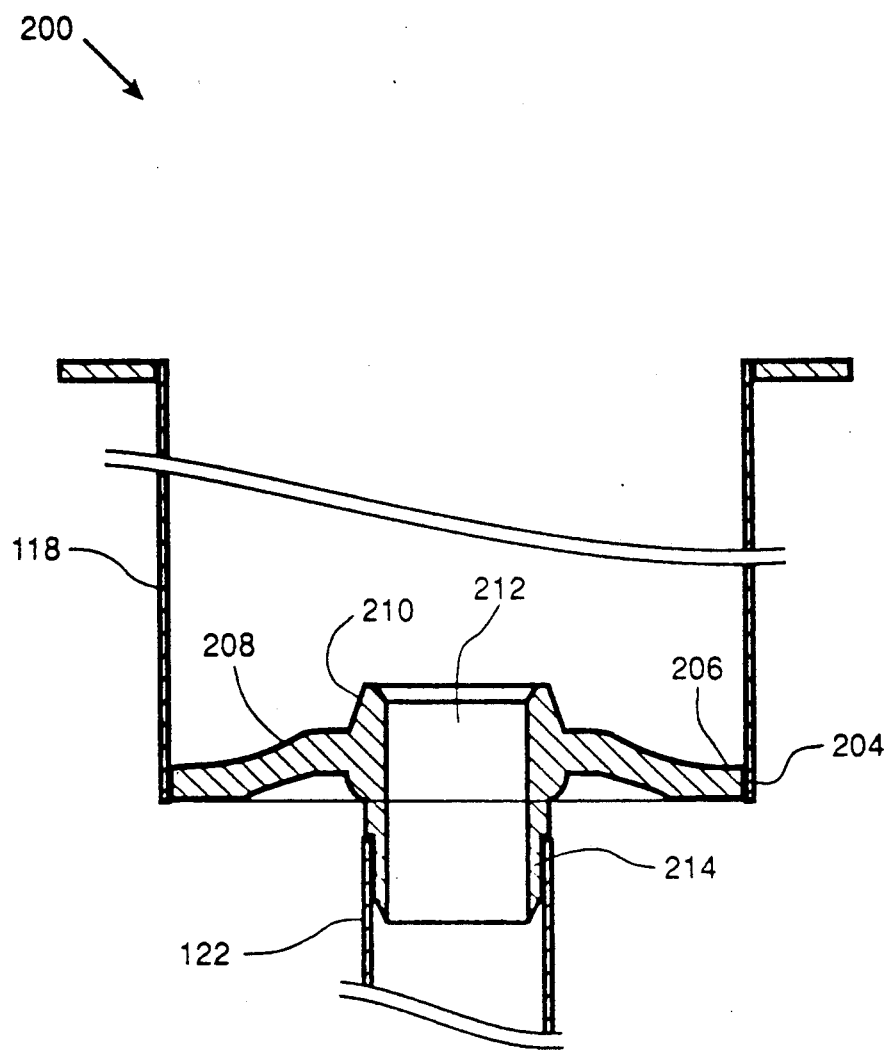
FIG. 2 is a sectional view of a guide tube mounted on a control rod drive housing of the reactor vessel of FIG. 1.

Each control rod guide tube 118 includes a base 200, such as that shown in FIG. 2. Base 200 comprises, in radially inward order, a circular edge 204, a flat rim 206, a dome 208, a base ridge 210, and a central hole 212. Edge 204 of base 200 is welded to the bottom of the inner wall of guide tube 118 so that the diameter of base 200 is about the same as the inner diameter of guide tube 118. Central hole 212 extends through a cylindrical projection 214 from the bottom of base 200. This projection 214 is dimensioned to fit snugly into CRD housing 122 as shown in FIG. 2. Drive 120 couples to control blade 116 through central hole 212 and projection 214. Dome 208 is concave as viewed from the stub tube side of (below) base 200 to better support.

Figure 3:
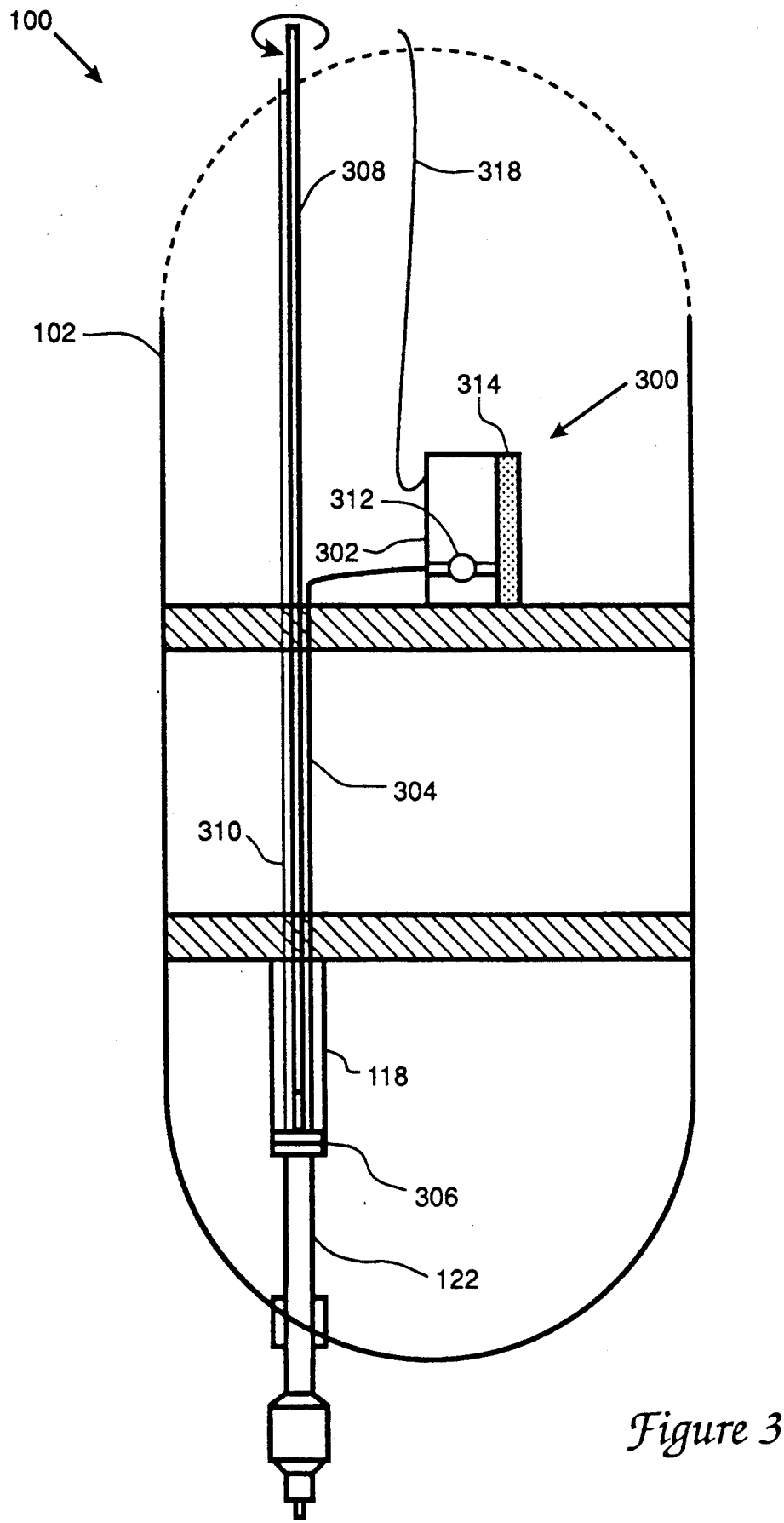
FIG. 3 is a schematic sectional view of the reactor vessel of FIG. 1 with a vacuum system in accordance with the present invention therein.

A major objective of the present invention is to clean the top side of dome 208 and flat rim 206 while isolating central hole 212 from the vacuum force that could otherwise remove components located in CRD housings 122. In accordance with the present invention, this objective is attained using a vacuum system 300, shown in FIG. 3.

Vacuum system 300 comprises a vacuum housing 302, a vacuum hose 304, and a vacuum head 306. A pole 308 is attached to vacuum head 306 so that the latter can be rotated by an operator standing on a maintenance bridge (not shown) above the reactor. Also attached to vacuum head 306 is a rope 310, the other end of which is attached to the maintenance bridge. Rope 310 assists in maneuvering head 306 as it is lowered into and removed from guide tube 118.

Vacuum housing 302 includes a vacuum pump 312 which forces water entering vacuum hose 304 via vacuum head 306 through an external filter 314, which traps particles entrained in the pumped water. Filtered water reenters the main body of coolant in vessel 102. A power cord 318 provides power from an external electrical source to vacuum pump 312.

Figure 4:
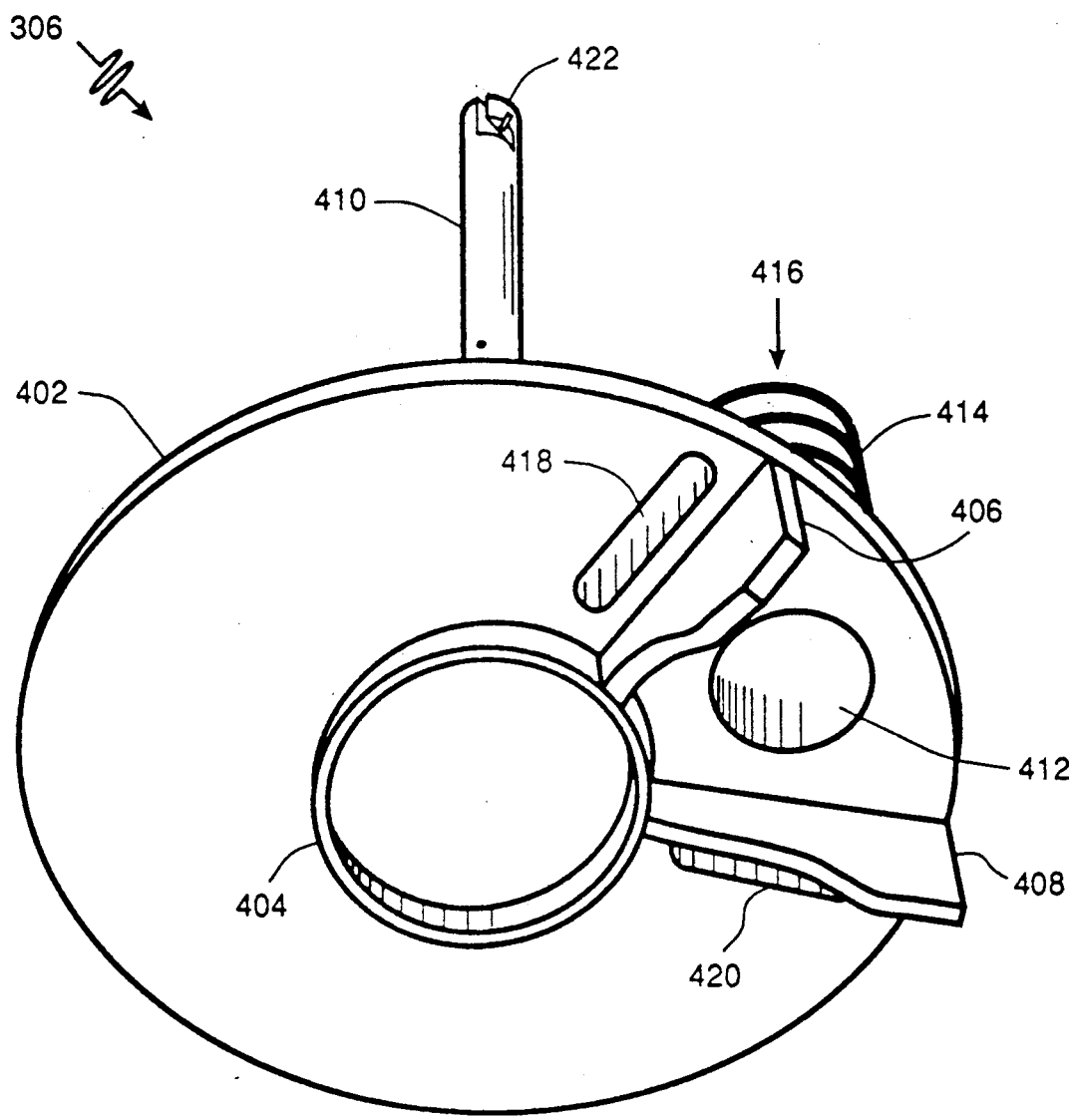
FIG. 4 is a bottom perspective view of a vacuum head in accordance with the present invention used to clean the base of the guide tube shown in FIG. 2.

Vacuum head 306 comprises a disk 402, an annular ridge 404, a pair of guide fins 406 and 408, and a pole adaptor 410, as shown in FIG. 4. A vacuum port aperture 412 through disk 402 and a ribbed hose coupling 414 welded over aperture 412 constitute a vacuum port 416. In addition, two inlet slots 418 and 420 are formed through disk 402. A top end 422 of pole adaptor 410 is configured for locking engagement with pole 308 for rotating vacuum head 306. Ribbed hose coupling 414 is designed for secure fitting with vacuum hose 304.

Figure 5:
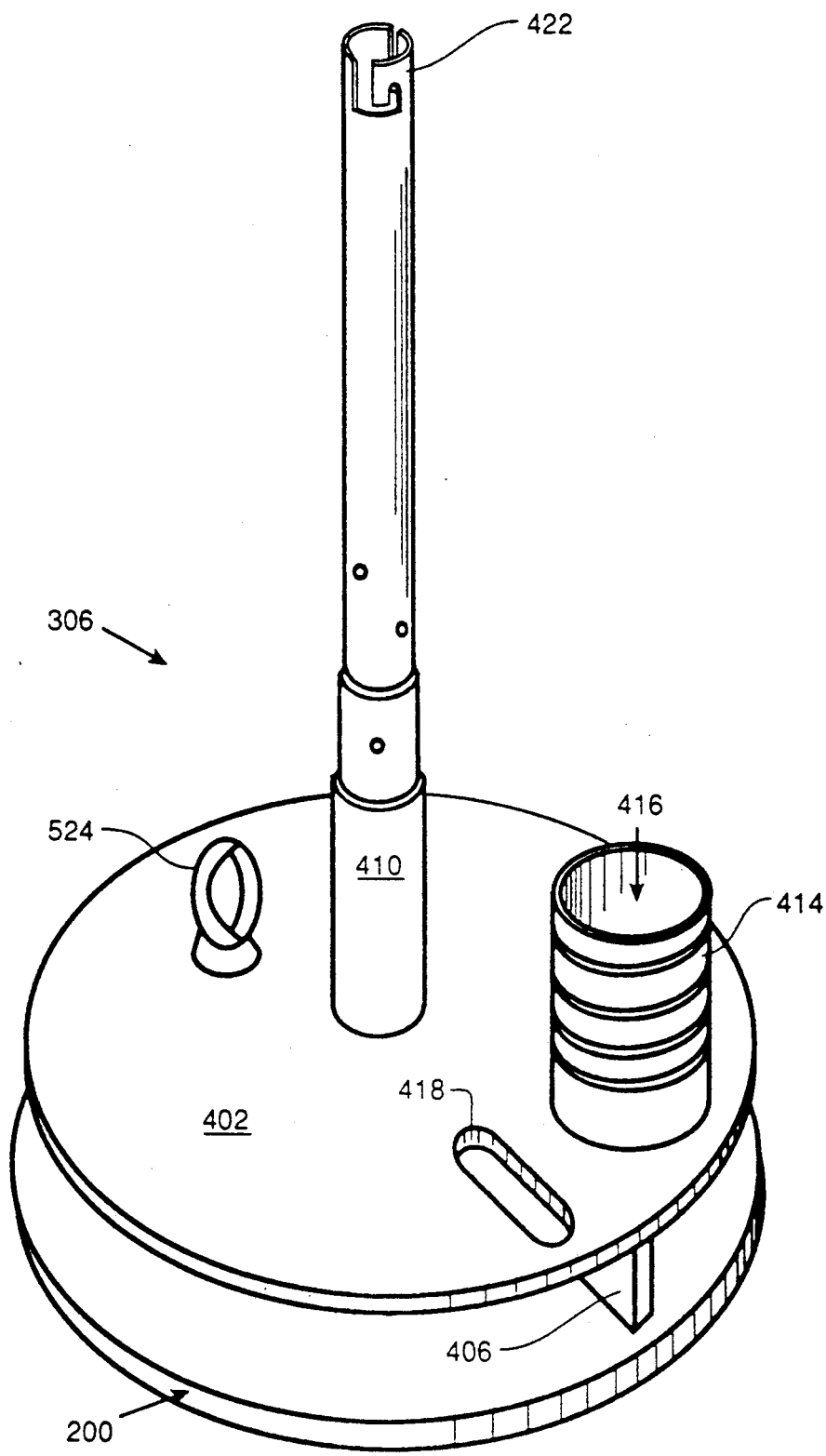
FIG. 5 is a perspective view of the vacuum head of FIG. 4 shown positioned on the base of the guide tube base shown in FIG. 2.

Vacuum head 306 is designed to conform to base 200. The diameter of disk 402 is about or slightly less than the diameter of base 200. Annular ridge 404 has an inner diameter slightly greater than the outer diameter of base ridge 210 so that annular ridge 404 freely fits over annular base ridge 210 so that vacuum head 306 can rotate freely relative to base 200. Annular ridges 404 and 210 insulate central hole 212 from vacuum applied on the outside of these ridges. Guide fins 406 and 408 are contoured at their bottoms (away from disk 402) to conform to dome 208 and flat rim 206. Vacuum head 306 also has a safety ring or lifting ring 524, shown in FIG. 5, to which rope 310 is tied.

Figure 6:
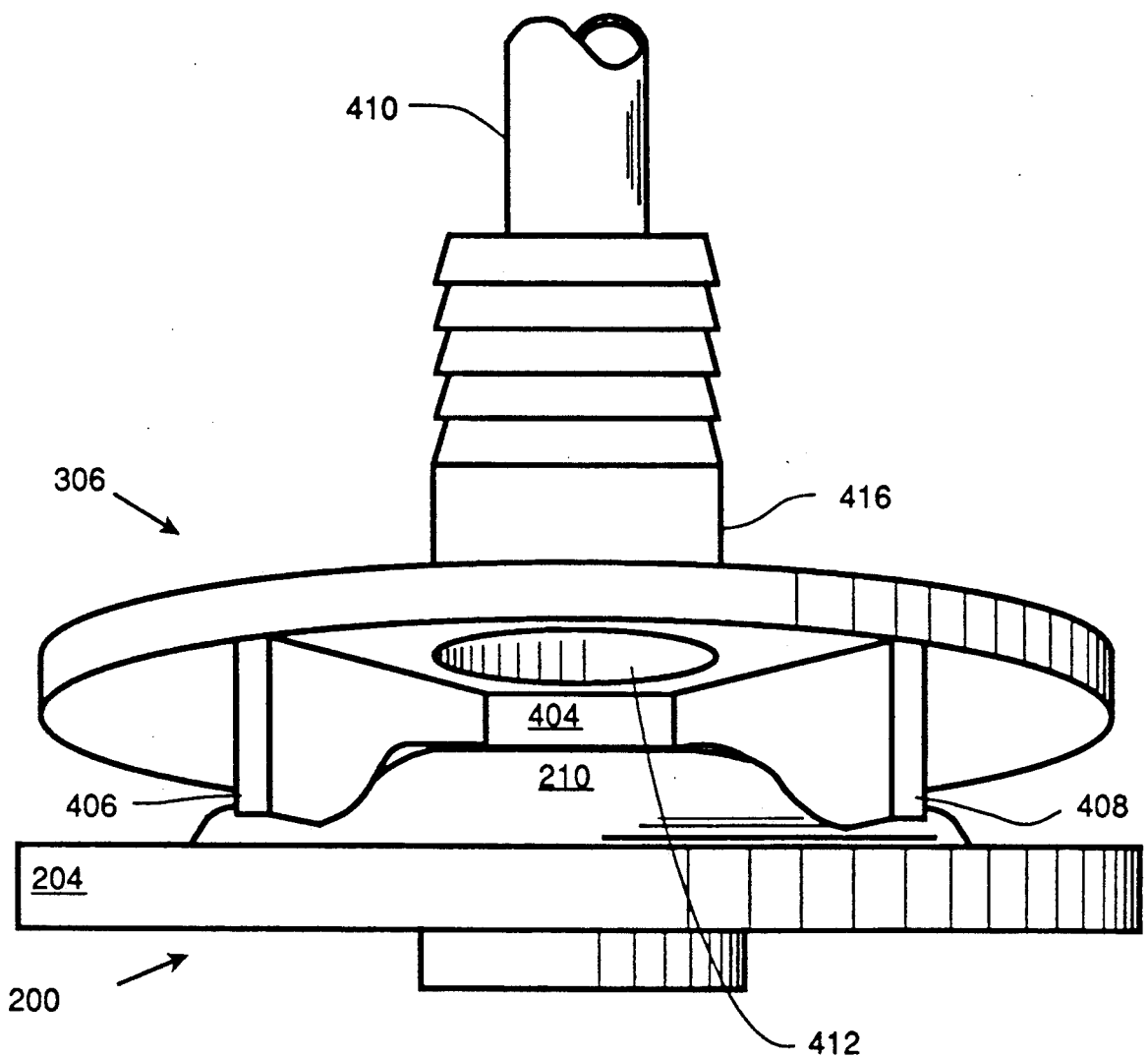
FIG. 6 is another nearly elevational perspective view of the vacuum head and guide tube base shown in FIG. 5.

As best shown in FIG. 6, guide fins 406 and 408 conform to but do not contact dome 208 and flat rim 206. Rather, guide fins 406 and 408 define radially extending clearances which are about ¼" high. These clearances represent restrictions in the flow paths from inlet slots 418 and 420 to vacuum port 416. These restrictions increase fluid velocity and turbulence near the fins. The increased velocity and turbulence help dislodge particles and other matter from base 200 so that they can be swept away by vacuum more easily.

During a maintenance procedure, vessel head 114, FIG. 1, is removed. The four fuel bundles 106 above a selected guide tube 118 are removed. The associated fuel support casting 128 is then removed. The associated control blade 116 can then be removed from above for replacement.

Vacuum hose 304, which is about 50' long and 2" in diameter, is attached at one end to ribbed hose coupling 414 and to vacuum housing 302 at the other end. Pole 308, which is about 80'0 long, is attached to pole adaptor 410. Rope 310 is tied at one end to ring 524 and to the maintenance bridge at the other end. Vacuum housing 302 is lowered onto top guide 132. Rope 310 is used to recover guide vacuum head 306 from guide tube 118 in the event that pole 308 is inadvertently detached.

Once vacuum head 306 is in position, vacuum pump 312 is turned on. An operator on the maintenance bridge can turn pole 308 so that vacuum head 306 rotates 360°. Vacuum head 306 can then be removed from guide tube 118 and inserted into another guide tube, which can then be cleaned. After all guide tubes to be cleaned are so treated, vacuum system 300 is removed from vessel 102.

The dimensions of vacuum head 306 are dependent on the dimensions of guide tube 118. Guide tube 118 has an inner diameter of about 10.25" near base 200, which has a diameter of about 10.20". Welding compensates for the difference. Vacuum disk 402 is 0.375" thick stainless steel and has a diameter of 10.00" so that it can cover most of base 200 without contacting the walls of guide tube 118. Vacuum port aperture 412 has a diameter of about 2", which diameter is matched by ribbed hose coupling 414. Hose 304 is 50' long with a diameter of 2". The center of vacuum port aperture 412 is 3.44" off the central axis of disk 402 along reference radius.

Figure 7:
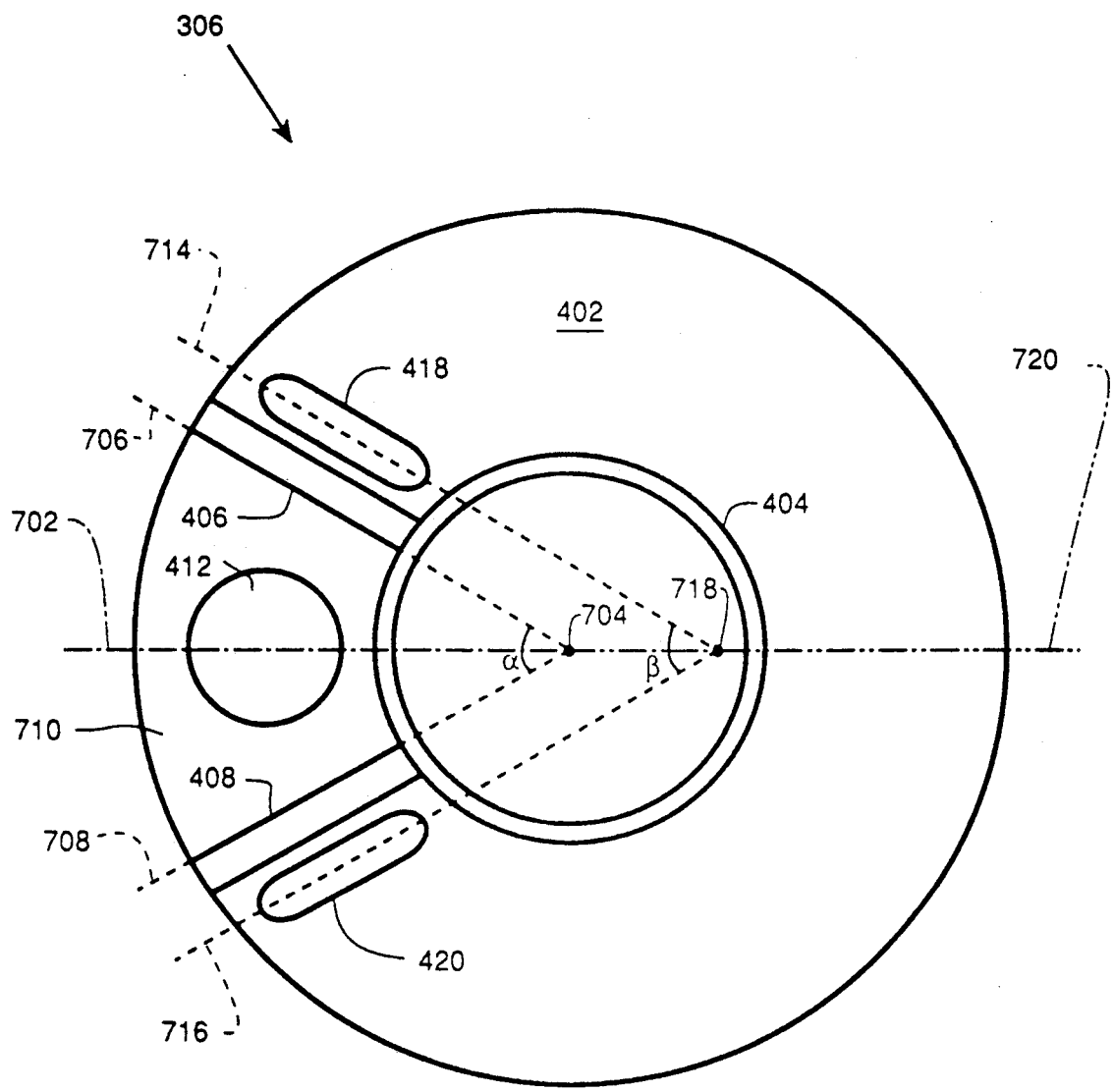
FIG. 7 is a bottom view of the vacuum head of FIG. 4.

As shown in FIG. 7, vacuum port aperture 412 is centered on a reference radius 702 from a center 704 of disk 402. Guide fins 406 and 408 are formed along respective radii 706 and 708 from the center 704 so that they define a pie-shaped section 710 of disk 402 which includes aperture 412 and excludes inlet slots 418 and 420. Preferably, the apex angle $\alpha$ of pie-shaped section 710 is between 45° and 90° and is bisected by reference radius 702. In the illustrated embodiment, angle $\alpha$ is about 56°. Thus, fluid entering inlet slots 418 and 420 must pass under guide fins 406 and 408 before exiting through vacuum port 416. This induces a high venturi action, enhancing the ability of vacuum system 300 to sweep up debris from base 200.

To ensure an even sweeping flow, inlet slots 418 and 420 extend parallel to guide fins 406 and 408. Inlet slots 418 and 420 are 2.25" by 0.5" oblongs. Lines 714 and 716 respectively bisecting slots 418 and 420 along their major axes. Lines 714 and 716 intersect at an apex 718 on a radius 720 opposite reference radius 702. Apex 718 is about 1.65" from the axis of disk 402 on the radius opposite the reference radius 702. Slots 418 and 420 begin 3.875" from apex 718. Lines 714 and 716 define an angle $\beta$ at apex 718 which is bisected by reference radius 702 and equal to angle $\alpha$; in the illustrated embodiment $\beta = 56°$. Thus, inlet slots 418 and 420 extend parallel to guide fins 406 and 408. Guide fins 406 and 408 are shaped as illustrated to conform to the shape of the top of base 200.

The present invention provides for many alternatives to system 300. Different dimensions, materials and arrangements can be selected to accommodate different reactors. Different embodiments incorporate different numbers of inlet slots, different angles for the slots and guide fins, and different shapes to conform to different guide tube bases. These and other modifications to and variations upon the described embodiments are provided for by the present invention, the scope of which is limited only by the following claims.

We claim:

1. A vacuum system for a boiling-water nuclear reactor guide tube comprising:
   a vacuum source;
   a vacuum tube coupled to said vacuum source;
   a disk having an axis, a top side and a bottom side, said disk defining axial, radial and circumferential directions, said disk having a vacuum port located at a first circumferential off-axis position on said disk, said vacuum port permitting fluid communication between said top side and said bottom side of said disk, said disk having aperture means for fluid communication, said aperture means including at least a first aperture therethrough at a second circumferential position circumferentially spaced from said vacuum port;
   coupling means for coupling said vacuum port to said vacuum tube;
   an annular ridge rigidly disposed on said bottom side of said disk, said annular ridge being concentric with said disk and radially inward of said vacuum port and said aperture means;
   first and second guide fins bonded to said bottom side of said disk, said first and second guide fins extending radially outward from said annular ridge, said guide fins bounding a section of said disk intersecting said vacuum port and excluding said aperture means; and
   a pole adaptor rigidly coupled to said disk, said pole adaptor extending axially and concentrically from said top side of said disk so that said disk can be rotated by rotating said pole adaptor;
   whereby, a surface having a central hole can be cleaned by positioning said disk so that said annular ridge contacts said surface and surrounds said central hole and so that radially extending gaps are defined between said fins and said surface, said cleaning being effected by applying a vacuum source to said vacuum port so that fluid flows from said top side through said aperture means to said bottom side, under said first and second fins, and from between said fins through said vacuum port to said top side, and then toward said vacuum source, said pole adaptor being rotated so that said vacuum port rotates at least 360° about said axis, said annular ridge isolating said central hole from said vacuum source.

2. A vacuum system as recited in claim 1 wherein said aperture means includes first and second apertures, said first fin being circumferentially nearer to said first aperture than to said second aperture, said second fin being circumferentially nearer to said second aperture than to said first aperture, said first fin extending radially between said first aperture and said vacuum port, said second fin extending radially between said second aperture and said vacuum port.

3. A vacuum system as recited in claim 2 wherein said first and second apertures are elongated slots, said first aperture extending parallel to said first fin and said second aperture extending parallel to said second fin.

4. A vacuum system as recited in claim 1 wherein said first and second fins define an angle between 45° and 90°.

5. A vacuum system as recited in claim 1 wherein said first and second fins define an angle of about 56°.

6. A vacuum head for cleaning the base of a guide tube supported by a stub tube of a nuclear reactor, said stub tube housing a control rod drive mechanism during reactor operation, said guide tube housing a control rod blade during reactor operation, said guide tube being cylindrical and having a guide tube inner diameter, said stub tube being cylindrical and having a stub tube inner diameter, said guide tube having a generally disk-shaped base which is supported by said stub tube, said base having a central aperture through which said drive mechanism can couple to said control rod blade, said central aperture having a central aperture diameter less than said guide tube inner diameter, said vacuum head comprising:
- a disk having an axis, a top side and a bottom side, said disk defining axial, radial and circumferential directions, said disk having a vacuum port located at a first circumferential off-axis position on said disk, said vacuum port permitting fluid communication between said top side and said bottom side of said disk, said disk having aperture means for fluid communication, said aperture means including at least a first aperture therethrough at a second circumferential position circumferentially spaced from said vacuum port, said disk having a disk diameter less than said guide tube inner diameter;
- an annular ridge rigidly disposed on said bottom side of said disk, said annular ridge being concentric with said disk and radially inward of said vacuum port and said first and second apertures, said annular ridge having a ridge diameter at least as great as said central aperture diameter;
- first and second guide fins bonded to said bottom side of said disk, said first and second guide fins extending radially outward from said annular ridge, said guide fins defining and partially bounding a section of said disk intersecting said vacuum port and excluding said aperture means, each of said fins being shaped to provide a clearance of at most ½" when said annular ridge is seated on said base; and
- a pole adaptor rigidly coupled to said disk, said pole adaptor extending axially and concentrically from said top side of said disk so that said disk can be rotated by rotating said pole adaptor.

7. A vacuum head as recited in claim 6 wherein said aperture means includes first and second apertures, said first fin being circumferentially nearer to said first aperture than to said second aperture, said second fin being circumferentially nearer to said second aperture than to said first aperture, said first fin extending radially between said first aperture and said vacuum port, said second fin extending radially between said second aperture and said vacuum port.

8. A vacuum head as recited in claim 7 wherein said first and second apertures are elongated slots, said first aperture extending parallel to said first fin and said second aperture extending parallel to said second fin.

9. A vacuum head for cleaning the base of a guide tube supported by a stub tube of a nuclear reactor, said stub tube housing a control rod drive mechanism during reactor operation, said guide tube housing a control rod blade during reactor operation, said guide tube being cylindrical and having a guide tube inner diameter, said stub tube being cylindrical and having a stub tube inner diameter, said guide tube having a generally disk-shaped base which is supported by said stub tube, said base having a central aperture through which said drive mechanism can couple to said control rod blade, said central aperture having a central aperture diameter less than said guide tube inner diameter, said vacuum head comprising:
- a disk having a disk axis, a top side and a bottom side, said disk defining axial, radial and circumferential directions, said disk having a vacuum port located at a first circumferential off-axis position on said disk, said vacuum port permitting fluid communication between said top side and said bottom side of said disk, said disk having first and second slots therethrough, said first slot having a first major axis, said second slot having a second major axis, said first and second major axes intersecting at a second off-axis circumferential position about 180° from said first circumferential off-axis position, said first and second major axes defining an angle of about 56°±6°, said disk having a disk diameter less than said guide tube inner diameter;
- an annular ridge rigidly disposed on said bottom side of said disk, said annular ridge being concentric with said disk and radially inward of said vacuum port and said first and second apertures, said annular ridge having a ridge diameter at least as great as said central aperture diameter;
- first and second guide fins bonded to said bottom side of said disk, said first guide fin extending radially outward from said annular ridge, parallel to said first slot, and between said vacuum port and said first slot, said second guide fin extending radially outward from said annular ridge, parallel to said second slot, and between said vacuum port and said second slot, said guide fins defining and partially bounding a section of said disk intersecting said vacuum port and excluding said first and second apertures, each of said fins being shaped to provide a clearance of at most ½" with said base when said annular ridge is seated on said base; and
- a pole adaptor rigidly coupled to said disk, said pole adaptor extending axially and concentrically from said top side of said disk so that said disk can be rotated by rotating said pole adaptor.

* * * * *